United States Patent
Combs et al.

(10) Patent No.: US 12,351,703 B2
(45) Date of Patent: Jul. 8, 2025

(54) CELLULOSE ESTER COMPOSITION AND ARTICLES MADE THEREFROM

(71) Applicant: Celanese International Corporation, Irving, TX (US)

(72) Inventors: Michael Combs, Shady Spring, WV (US); Narsi Devanathan, Florence, KY (US)

(73) Assignee: Acetate International LLC, Irving, TX (US)

(*) Notice: Subject to any disclaimer, the term of this patent is extended or adjusted under 35 U.S.C. 154(b) by 847 days.

(21) Appl. No.: 17/531,336

(22) Filed: Nov. 19, 2021

(65) Prior Publication Data

US 2022/0162423 A1    May 26, 2022

Related U.S. Application Data

(60) Provisional application No. 63/116,464, filed on Nov. 20, 2020.

(51) Int. Cl.
    *C08L 1/12*    (2006.01)

(52) U.S. Cl.
    CPC .............. *C08L 1/12* (2013.01); *C08L 2201/06* (2013.01); *C08L 2205/025* (2013.01); *C08L 2205/03* (2013.01); *C08L 2205/06* (2013.01); *C08L 2205/16* (2013.01)

(58) Field of Classification Search
    None
    See application file for complete search history.

(56) References Cited

U.S. PATENT DOCUMENTS 5,288,318 A    2/1994    Mayer et al.

FOREIGN PATENT DOCUMENTS

| EP | 0092996 A1 | 11/1983 |
| RU | 2404205 C1 | 11/2010 |
| WO | WO 2004/047572 A1 | 6/2004 |

OTHER PUBLICATIONS

Phuong, Vu Thanh, and Andrea Lazzeri. ""Green" biocomposites based on cellulose diacetate and regenerated cellulose microfibers: Effect of plasticizer content on morphology and mechanical properties." Composites Part A: Applied Science and Manufacturing 43.12 (2012): 2256-2268.*

International Search Report and The Written Opinion of the International Searching Authority, or the Declaration Corresponding to Application No. PCT/US21/60027 on Feb. 8, 2022.

* cited by examiner

*Primary Examiner* — Patrick T Lewis

(74) *Attorney, Agent, or Firm* — Kilpatrick Townsend & Stockton LLP

(57) ABSTRACT

A polymer composition containing cellulose acetate in combination with one or more plasticizers and one or more biodegradable fillers. The biodegradable fillers can include monosaccharides, polysaccharides, esters thereof, and mixtures thereof. The polymer composition is formulated so as to have properties similar to petroleum-based polymers for producing, for example, single-use biodegradable articles.

20 Claims, 6 Drawing Sheets

CELLULOSE ESTER COMPOSITION AND ARTICLES MADE THEREFROM

RELATED APPLICATIONS

The present application is based upon and claims priority to U.S. Provisional Patent Application Ser. No. 63/116,464, having a filing date of Nov. 20, 2020, which is incorporated herein by reference.

BACKGROUND

Each year, the global production of plastics continues to increase. Over one-half of the amount of plastics produced each year are used to produce plastic bottles, containers, drinking straws, and other single-use items. For example, over 100 million disposable plastic straws are manufactured and placed in use every year.

The discarded, single-use plastic articles, including plastic drinking bottles and straws, are typically not recycled and end up in landfills. In addition, many of these items are not properly disposed of and end up in streams, lakes, and in the oceans around the world. In fact, plastic waste tends to agglomerate and concentrate in oceans in certain areas of the world due to currents and the buoyancy of the products.

Plastic waste can be harmful to ecosystems and to animals, including marine life and birds. Plastic waste, for instance, disintegrates very slowly into smaller and smaller pieces that become ingested by aquatic organisms and fish.

In view of the above, those skilled in the art have attempted to produce plastic articles made from biodegradable polymers. Many biodegradable polymers, however, lack the physical properties and characteristics of conventional polymers, such as polypropylene and/or polyethylene terephthalate.

Cellulose esters have been proposed in the past as a replacement to some petroleum-based polymers or plastics. Cellulose esters, for instance, are generally considered environmentally-friendly polymers because they are recyclable, degradable and derived from renewable resources, such as wood pulp. Problems have been experienced, however, in melt processing cellulose ester polymers, such as cellulose acetate polymers. In addition, articles made from cellulose acetate polymers have various drawbacks due to the mechanical properties of the polymer.

In view of the above, a need currently exists for biodegradable polymer compositions that have similar properties to petroleum-based polymers and can be melt processed for forming various three-dimensional articles. A need also exists for a cellulose acetate polymer composition that has enhanced biodegradability and/or has improved mechanical properties.

SUMMARY

In general, the present disclosure is directed to a polymer composition containing a cellulose acetate polymer in combination with at least one plasticizer, and a biodegradable filler. The biodegradable filler, for instance, can be a monosaccharide, a monosaccharide ester, a polysaccharide, a polysaccharide ester, or mixtures thereof. The biodegradable filler can improve the biodegradable characteristics of the cellulose acetate polymer and/or improve the mechanical properties of articles made from the polymer composition.

The polymer composition of the present disclosure, for instance, can be used in injection molding processes, extrusion processes, or in other melt processing system. The biodegradable filler can be added during production of an article. Alternatively, the biodegradable filler can be combined with the cellulose acetate polymer in an extrusion process and formed into pellets which are then later used to form various polymer articles.

In one aspect, the polymer composition comprises a cellulose ester polymer, such as a cellulose acetate polymer, in combination with at least one plasticizer and at least one biodegradable filler. The biodegradable filler can be a monosaccharide, a monosaccharide ester, a polysaccharide, a polysaccharide ester, or combinations thereof. The biodegradable filler can be in the form of fibers, a powder, particles, mixtures thereof, and the like. The biodegradable filler can also be in the form of a solution or suspension when combined with the cellulose ester polymer.

In one aspect, the biodegradable filler can comprise dextran, starch, hydrolyzed starch, modified hydrolyzed starch, alpha-1,3-glucan including glucan polymers, or mixtures thereof. In another aspect, the biodegradable filler can comprise alpha cellulose, bast fibers such as hemp, hardwood fibers, softwood fibers, sisal fibers, viscose fibers, or mixtures thereof. In still another aspect, the biodegradable filler can comprise an engineered polysaccharide.

One or more biodegradable fillers as described above can be present in the polymer composition generally in an amount from about 0.1% to about 75% by weight. For example, one or more biodegradable fillers can be present in the polymer composition in an amount from about 3% to about 50% by weight, such as in an amount from about 3% to about 25% by weight.

The cellulose acetate can be present in the composition in an amount from about 15% to about 85% by weight, such as from about 55% to about 80% by weight. The cellulose acetate can be comprised primarily of cellulose diacetate. For instance, the cellulose acetate can contain cellulose diacetate in an amount greater than about 90% by weight, such as in an amount greater than about 95% by weight. In one aspect, the cellulose ester polymer or cellulose acetate can have a degree of substitution of from about 1.3 to about 2.9. One or more plasticizers, on the other hand, can be present in the polymer composition in an amount of from about 8% to about 40% by weight, such as in an amount from about 12% to about 20% by weight. In one aspect, the one or more plasticizers can be present in the polymer composition in an amount of about 19% by weight or less, such as in an amount of about 17% by weight or less, such as in an amount of about 15% by weight or less.

In general, any suitable plasticizer can be incorporated into the polymer composition. Plasticizers that may be used include triacetin, tris(clorisopropyl) phosphate, tris(2-chloro-1-methylethyl) phosphate, glycerin, monoacetin, biacetin, triethyl citrate, acetyl triethyl citrate, or mixtures thereof.

The polymer composition can also contain various other additives and ingredients. For instance, the polymer composition can contain an acid scavenger, an antioxidant, a coloring agent, and the like.

Polymer compositions formulated in accordance with the present disclosure can be used to produce injection molded or extruded articles. In one embodiment, the polymer composition can comprise a foam or formed into a foam during production of an article.

Polymer articles that may be made in accordance with the present disclosure include drinking straws, beverage holders, automotive parts, knobs, door handles, lids, packaging, cutlery, consumer appliance parts, containers and any other suitable disposable product. For instance, the present disclosure is also directed to a drinking straw comprising an elongated tubular member defining a passageway from a first end to a second and opposite end. The drinking straw is formed from a polymer composition as described above.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
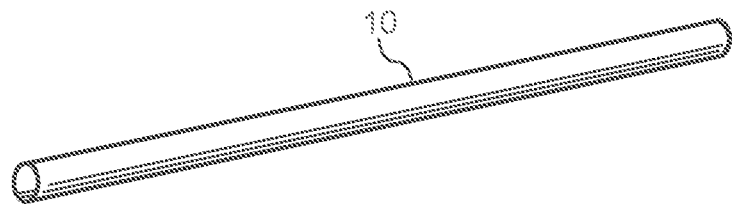
FIG. 1 is a perspective view of a drinking straw that may be made in accordance with the present disclosure.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to polymer compositions containing a cellulose ester polymer in combination with other components that improve the melt processing properties of the cellulose acetate and/or the physical properties of the cellulose acetate. In accordance with the present disclosure, a cellulose acetate is combined with one or more plasticizers and one or more biodegradable fillers. The biodegradable filler, for instance, can be a monosaccharide, a monosaccharide ester, a polysaccharide, a polysaccharide ester, or mixtures thereof. In one aspect, one or more biodegradable fillers are selected that have a greater degradation rate than that of the cellulose ester polymer. In this manner, degradation of polymer articles made from the polymer composition can be significantly accelerated after use.

In addition, polymer compositions formulated in accordance with the present disclosure can also have dramatically improved mechanical properties. The polymer composition can be used to form all different types of products using any suitable molding technique, such as extrusion, injection molding, rotational molding, gel processing, and the like.

In general, any suitable cellulose ester polymer can be incorporated into the polymer composition of the present disclosure. In one aspect, the cellulose ester polymer is a cellulose acetate.

Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses of the Miscanthus family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification.

Cellulose esters suitable for use in producing the composition of the present disclosure may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof.

The cellulose acetate used in the composition may be cellulose diacetate or cellulose triacetate. In one embodiment, the cellulose acetate comprises primarily cellulose diacetate. For example, the cellulose acetate can contain less than 1% by weight cellulose triacetate, such as less than about 0.5% by weight cellulose triacetate. Cellulose diacetate can make up greater than 90% by weight of the cellulose acetate, such as greater than about 95% by weight, such as greater than about 98% by weight, such as greater than about 99% by weight of the cellulose acetate.

In general, the cellulose acetate can have a molecular weight of greater than about 10,000, such as greater than about 20,000, such as greater than about 30,000, such as greater than about 40,000, such as greater than about 50,000. The molecular weight of the cellulose acetate is generally less than about 300,000, such as less than about 250,000, such as less than about 200,000, such as less than about 150,000, such as less than about 100,000, such as less than about 90,000, such as less than about 70,000, such as less than about 50,000. The molecular weights identified above refer to the number average molecular weight. Molecular weight can be determined using gel permeation chromatography using a polystyrene equivalent or standard.

The biodegradation of the cellulose ester polymer can depend upon various factors including the degree of substitution. The degree of substitution of cellulose ester can be measured, for example, using ASTM Test 871-96 (2010). The cellulose acetate polymer incorporated into the polymer composition can generally have a degree of substitution of greater than about 1.3, such as greater than about 1.5, such as greater than about 1.7, such as greater than about 1.9, such as greater than about 2.1, such as greater than about 2.3. The degree of substitution is generally less than about 2.9, such as less than about 2.7, such as less than about 2.6, such as less than about 2.4.

The cellulose ester polymer or cellulose acetate can have an intrinsic viscosity of generally greater than about 0.5 dL/g, such as greater than about 0.8 dL/g, such as greater than about 1 dL/g, such as greater than about 1.2 dL/g, such as greater than about 1.4 dL/g, such as greater than about 1.6 dL/g. The intrinsic viscosity is generally less than about 2 dL/g, such as less than about 1.8 dL/g, such as less than about 1.7 dL/g, such as less than about 1.65 dL/g. Intrinsic viscosity may be measured by forming a solution of 0.20 g/dL cellulose ester in 98/2 wt/wt acetone/water and measuring the flow times of the solution and the solvent at 30° C. in a #25 Cannon-Ubbelohde viscometer. Then, the modified Baker-Philippoff equation may be used to determine intrinsic viscosity ("IV"), which for this solvent system is Equation 1.

$$IV = \left(\frac{k}{c}\right)(\text{antilog}(\log n_{rel})/k) - 1) \quad \text{Equation 1}$$

$$\text{where } n_{rel} = \left(\frac{t_1}{t_2}\right),$$

$t_1$=the average flow time of solution (having cellulose ester) in seconds, $t_2$=the average flow times of solvent in seconds, k=solvent constant (10 for 98/2 wt/wt acetone/water), and c=concentration (0.200 g/dL).

The cellulose acetate is generally present in the polymer composition in an amount greater than about 15% by weight, such as in an amount greater than about 25% by weight, such as in an amount greater than about 35% by weight, such as in an amount greater than about 45% by weight, such as in an amount greater than about 55% by weight. The cellulose acetate is generally present in the polymer composition in an amount less than about 85% by weight, such as in an amount less than about 80% by weight, such as in an amount less than about 75% by weight, such as in an amount less than about 70% by weight, such as in an amount less than about 65% by weight.

In accordance with the present disclosure, a cellulose ester polymer is combined with one or more biodegradable fillers and one or more plasticizers. As described above, the biodegradable fillers generally include monosaccharides, esters thereof, polysaccharides, esters thereof, or mixtures thereof. In one aspect, a biodegradable filler is selected that has a greater degradation rate than that of the cellulose ester polymer. Some fillers, such as starch, glucose, or dextran, may also serve as a food source for a variety of microbials. Thus, such fillers would also further accelerate degradation of the polymer once it enters the solid waste stream. One or more biodegradable fillers can also be selected in order to improve one or more mechanical properties. In addition, combinations of different fillers may be used to take advantage of different properties and performance of polymer articles made from the polymer composition. Dextran or starch, for instance, may be included in the polymer composition in order to improve degradation, while cellulose fibers, such as hemp or softwood fibers, can be included in the polymer composition in order to increase strength or improve other mechanical properties.

The biodegradable fillers for use in the present disclosure can have various forms. For instance, in one aspect, the biodegradable filler can be in the form of a powder or in the form of particles. Alternatively, the filler can be in the form of fibers. The fibers can have a relatively short length or can have a relatively long length. For instance, fibers can be used that can have a length of from about 0.1 mm to about 5 mm, such as from about 0.8 mm to about 2.5 mm. In other embodiments, the fibers can have a length of greater than about 5 mm, such as greater than about 6 mm, and generally less than about 12 mm, such as less than about 10 mm.

As described above, the biodegradable filler can be a monosaccharide. Suitable monosaccharides include glucose, sucrose, lactose, fructose, galactose, ribose, zylose, and mixtures thereof. The biodegradable filler can also be a polysaccharide or esters thereof, which includes disaccharides and engineered polysaccharides. Polysaccharides that may be selected for use in the present disclosure include starches, cellulose such as alpha cellulose, hemicellulose, hyaluronic compounds, alginate, guar gums, chitin, chondroitin, starches, modified starches, hydrolyzed starches, modified hydrolyzed starches, sisal, viscose, glucan compounds and polymers including alpha-1,3-glucan, hemp seed, and the like.

In general, one or more biodegradable fillers may be incorporated into the polymer composition in an amount of from about 0.1% by weight to about 95% by weight, including all increments of 1% by weight therebetween. For example, one or more biodegradable fillers can be incorporated into the polymer composition in an amount greater than about 1% by weight, such as in an amount greater than about 3% by weight, such as in an amount greater than about 5% by weight, such as in an amount greater than about 7% by weight, such as in an amount greater than about 10% by weight, such as in an amount greater than about 12% by weight, such as in an amount greater than about 15% by weight, such as in an amount greater than about 17% by weight, such as in an amount greater than about 20% by weight, such as in an amount greater than about 22% by weight, such as in an amount greater than about 25% by weight, such as in an amount greater than about 27% by weight, such as in an amount greater than about 30% by weight. One or more biodegradable fillers are generally present in the polymer composition in an amount less than about 80% by weight, such as in an amount less than about 50% by weight, such as in an amount less than about 40% by weight, such as in an amount less than about 30% by weight.

The weight ratio of the cellulose acetate polymer to one or more biodegradable fillers can generally be from about 1:99 to about 99:1. For instance, the weight ratio of cellulose acetate to one or more biodegradable fillers can be from about 1:75 to about 75:1, such as from about 1:50 to about 50:1, such as from about 1:25 to about 25:1, such as from about 1:10 to about 10:1, such as from about 1:5 to about 5:1. In one aspect, the cellulose acetate is present in greater amounts than the biodegradable filler. For instance, the weight ratio between the cellulose acetate and the one or more biodegradable fillers can be at least about 1.5:1, such as at least about 2:1, such as at least 3:1, such as at least 5:1, such as at least 10:1.

In addition to one or more biodegradable fillers, the cellulose acetate is combined also with one or more plasticizers. Plasticizers particularly well suited for use in the polymer composition include triacetin, monoacetin, diacetin, and mixtures thereof. Other suitable plasticizers include tris(clorisopropyl) phosphate, tris(2-chloro-1-methylethyl) phosphate, triethyl citrate, acetyl triethyl citrate, glycerin, or mixtures thereof.

Other examples of plasticizers include, but are not limited to, trimethyl phosphate, triethyl phosphate, tributyl phosphate, triphenyl phosphate, acetyl tributyl citrate, tributyl-o-acetyl citrate, dibutyl tartrate, ethyl o-benzoylbenzoate, n-ethyltoluenesulfonamide, o-cresyl p-toluenesulfonate, aromatic diol, substituted aromatic diols, aromatic ethers, tripropionin, tribenzoin, glycerin, glycerin esters, glycerol tribenzoate, glycerol acetate benzoate, polyethylene glycol, polyethylene glycol esters, polyethylene glycol diesters, di-2-ethylhexyl polyethylene glycol ester, glycerol esters, diethylene glycol, polypropylene glycol, polyglycoldiglycidyl ethers, dimethyl sulfoxide, N-methyl pyrollidinone, propylene carbonate, $C_1$-$C_{20}$ dicarboxylic acid esters, dimethyl adipate (and other dialkyl esters), di-butyl maleate, di-octyl maleate, resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkyl lactones (e.g., .gamma.-valerolactone), alkylphosphate esters, aryl phosphate esters, phospholipids, aromas (including some described herein, e.g., eugenol, cinnamyl alcohol, camphor, methoxy hydroxy acetophenone (acetovanillone), vanillin, and ethylvanillin), 2-phenoxyethanol, glycol ethers, glycol esters, glycol ester ethers, polyglycol ethers, polyglycol esters, ethylene glycol ethers, propylene glycol ethers, ethylene glycol esters (e.g., ethylene glycol diacetate), propylene glycol esters, polypropylene glycol esters, acetylsalicylic acid, acetaminophen, naproxen, imidazole, triethanol amine, benzoic acid, benzyl benzoate, salicylic acid, 4-hydroxybenzoic acid, propyl-4-hydroxybenzoate, methyl-4-hydroxybenzoate, ethyl-4-hydroxybenzoate, benzyl-4-hydroxybenzoate, glyceryl tribenzoate, neopentyl dibenzoate, triethylene glycol dibenzoate, trimethylolethane tribenzoate, butylated hydroxytoluene, butylated hydroxyanisol, sorbitol, xylitol, ethylene diamine, piperidine, piperazine, hexamethylene diamine, triazine, triazole, pyrrole, and the like, any derivative thereof, and any combination thereof.

In one aspect, a carbonate ester may serve as a plasticizer. Exemplary carbonate esters may include, but are not limited to, propylene carbonate, butylene carbonate, diphenyl carbonate, phenyl methyl carbonate, dicresyl carbonate, glycerin carbonate, dimethyl carbonate, diethyl carbonate, ethylene carbonate, propylene carbonate, isopropylphenyl 2-ethylhexyl carbonate, phenyl 2-ethylhexyl carbonate, isopropylphenyl isodecyl carbonate, isopropylphenyl tridecyl carbonate, phenyl tridecyl carbonate, and the like, and any combination thereof.

In still another aspect, the plasticizer can be a polyol benzoate. Exemplary polyol benzoates may include, but are not limited to, glyceryl tribenzoate, propylene glycol dibenzoate, diethylene glycol dibenzoate, dipropylene glycol dibenzoate, triethylene glycol dibenzoate, sucrose benzoate, polyethylene glycol dibenzoate, neopentylglycol dibenzoate, trimethylolpropane tribenzoate, trimethylolethane tribenzoate, pentaerythritol tetrabenzoate, sucrose benzoate (with a degree of substitution of 1-8), and combinations thereof. In some instances, tribenzoates like glyceryl tribenzoate may be preferred. In some instances, polyol benzoates may be solids at 25° C. and a water solubility of less than 0.05 g/100 mL at 25° C.

The plasticizer can also be bio-based. For example, using a bio-based plasticizer can render the polymer composition well suited for contact with food items. Bio-based plasticizers particularly well suited for use in the composition of the present disclosure include an alkyl ketal ester, a non-petroleum hydrocarbon ester, a bio-based polymer or oligomer, such as polycaprolactone, having a number average molecular weight of 1000 or less, or mixtures thereof.

In one aspect, the bio-based plasticizer is an alkyl ketal ester having a chemical structure corresponding to Structure I as provided below:

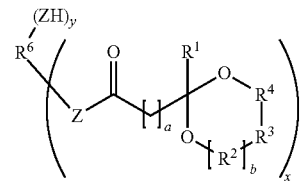

wherein a is from 0 to 12; b is 0 or 1; each $R^1$ is independently hydrogen, a hydrocarbyl group, or a substituted hydrocarbyl group; each $R^2$, $R^3$, and $R^4$ are independently methylene, alkylmethylene, or dialkylmethylene, x is at least 1, y is 0 or a positive number and x+y is at least 2; $R^6$ is a hydrocarbyl group or a substituted hydrocarbyl group and each Z is independently —O—, —NH— or —NR— where R is a hydrocarbyl group or a substituted hydrocarbyl group.

The plasticizer identified above corresponds to a reaction product of a polyol, aminoalcohol or polyamine and certain 1,2- and/or 1,3-alkanediol ketal of an oxocarboxylate esters. 1,2- and 1,3-alkanediols ketals of oxocarboxylate esters are referred to herein as "alkyl ketal esters". Up to one mole of alkyl ketal ester can be reacted per equivalent of hydroxyl groups or amino groups provided by the polyol, aminoalcohol or polyamine. The polyol, aminoalcohol or polyamine is most preferably difunctional, but polyols, aminoalcohols and polyamines having more than two hydroxyl and/or amino groups can be used.

The values of x and y in structure I will depend on the number of hydroxyl groups or amino groups on the polyol, aminoalcohol or polyamine, the number of moles of the alkyl ketal ester per mole of the polyol, aminoalcohol or polyamine, and the extent to which the reaction is taken towards completion. Higher amounts of the alkyl ketal ester favor lower values for y and higher values of x.

In structure I, y is specifically from 0 to 2 and x is specifically at least 2. All a in structure I are specifically 2 to 12, more specifically, 2 to 10, more specifically, 2 to 8, more specifically, 2 to 6, more specifically, 2 to 4, and more specifically, 2. All $R^1$ are specifically an alkyl group, specifically methyl. In some embodiments of structure I, all Z are —O—, y is —O— and x is 2; these products correspond to a reaction of two moles of an alkyl ketal ester and one mole of a diol. In some other embodiments, all Z are —O—, y is 1 and x is 1; these products correspond to the reaction of one mole of the alkyl ketal ester and one mole of a diol.

In one embodiment, all b are 0. In another embodiment, all b are 1.

Some specific compounds according to structure I include those having the structure:

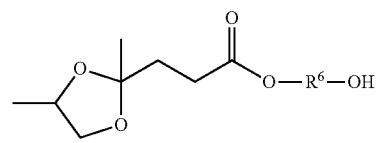

or the structure

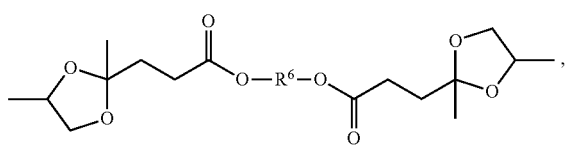

or the structure

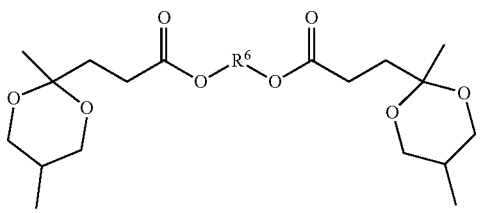

particularly in which $R^6$ is —$(CH_2)$—$_m$ wherein m is from 2 to 18, especially 2, 3, 4 or 6. In one specific embodiment, $R^6$ corresponds to the residue, after removal of hydroxyl groups, of 1,4-butane diol resulting in the structure (Ia)

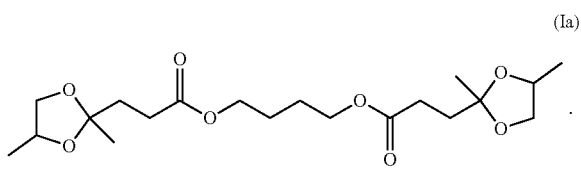
(Ia)

In another specific embodiment, $R^6$ corresponds to the residue, after removal of hydroxyl groups, of diethylene glycol resulting in structure (Ib)

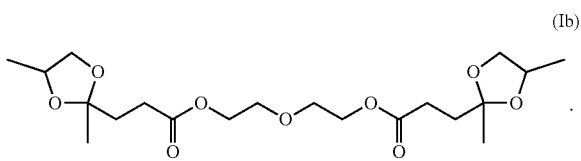
(Ib)

In another specific embodiment, $R^6$ corresponds to the residue, after removal of hydroxyl groups, of 2-methyl. 1-3 propane diol resulting in structure (Ic)

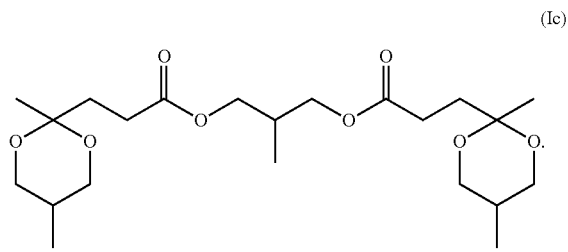 [SMILES: CC(COC(=O)CCC1(C)OCC(C)CO1)COC(=O)CCC1(C)OCC(C)CO1]
(Ic)

Compounds according to structure I can be prepared in a transesterification or ester-aminolysis reaction between the corresponding polyol, aminoalcohol or polyamine and the corresponding alkyl ketal ester. Alternatively, compounds according to structure I can be prepared by reacting an oxocarboxylic acid with the polyol, aminoalcohol or polyamine to form an ester or amide, and then ketalizing the resulting product with a 1,2- or 1,3-alkane diol such as ethylene glycol, 1,2-propanediol, 1,3-propanediol, 2-methyl, 1-3 propane diol, 1,2-butanediol, 1,3-butanediol, 1,2-pentanediol, 1,3-pentanediol, 1,2-hexanediol, 1,3-hexanediol, and the like.

Alkyl ketal ester plasticizers are particularly well suited for use in conjunction with one or more other plasticizers. For example, in one aspect, an alkyl ketal ester plasticizer can be combined with a benzoate ester. The weight ratio between the two plasticizers can vary such as from about 1:10 to about 10:1, such as from about 1:4 to about 4:1.

Another bio-based plasticizer that may be incorporated into the polymer composition of the present disclosure is a non-petroleum hydrocarbon ester. For example, one example of a non-petroleum hydrocarbon ester is sold under the tradename HALLGREEN by the Hall Star Company of Chicago, Illinois. Non-petroleum hydrocarbon ester plasticizers, for instance, can contain greater than about 50% by weight, such as greater than about 70% by weight, such as greater than about 99% by weight of bio-based content. The esters, for instance, can be derived primarily from agricultural, forestry, or marine materials and thus are biodegradable. In one aspect, the non-petroleum hydrocarbon ester plasticizer has a specific gravity at 25° C. of about 1.16 or greater, such as about 1.165 or greater, such as about 1.17 or greater, such as about 1.74 or greater, and generally about 1.19 or less, such as about 1.185 or less, such as about 1.18 or less, such as about 1.78 or less. The non-petroleum hydrocarbon ester plasticizer can have an acid value of from about 0.5 mgKOH/g to about 0.6 mgKOH/g, such as from about 0.53 mgKOH/g to about 0.57 mgKOH/g.

In another aspect, the polymer composition contains a bio-based plasticizer that is a bio-based polyester, such as a bio-based aliphatic polyester having a relatively low molecular weight. For example, the plasticizer can comprise a bio-based polyester polymer having a number average molecular weight of less than about 1000, such as less than about 900, such as less than about 800, and generally greater than about 500. In one embodiment, the bio-based plasticizer is a polycaprolactone having a number average molecular weight of 1000 or less. Alternatively, the bio-based plasticizer may be a polyhydroxyalkanoate having a number average molecular weight of 1000 or less.

In one aspect, the plasticizer is phthalate-free. In fact, the polymer composition can be formulated to be phthalate-free. For instance, phthalates can be present in the polymer composition in an amount of about 0.5% or less, such as in an amount of about 0.1% or less.

In general, one or more plasticizers can be present in the polymer composition in an amount from about 8% to about 40% by weight, such as in an amount from about 12% to about 35% by weight. In one aspect, one or more plasticizers can be present in the polymer composition in an amount of about 19% or less, such as in an amount of about 17% or less, such as in an amount of about 15% or less, such as in an amount of about 13% or less, such as in an amount of about 10% or less. One or more plasticizers are generally present in an amount from about 5% or greater, such as in an amount of about 10% or greater.

The cellulose acetate can be present in relation to the plasticizer such that the weight ratio between the cellulose acetate and the one or more plasticizers is from about 60:40 to about 85:15, such as from about 70:30 to about 80:20. In one embodiment, the cellulose acetate to plasticizer weight ratio is about 75:25.

In addition to a cellulose ester polymer, one or more biodegradable fillers, and one or more plasticizers, the polymer composition can contain various other additives and ingredients. For example, the polymer composition can contain one or more acid scavengers that can be used to reduce acid emissions, such as acetic acid emissions. Suitable acid scavengers include alkali metal salts, alkaline earth metal salts, a carbonate, an oxide, a hydroxide, an amine, or mixtures thereof. Particular acid scavengers include zinc oxide, magnesium oxide, calcium carbonate, aluminum sodium carbonate, aluminum silicate, a hydrotalcite, and mixtures thereof. One or more acid scavengers can be present in the polymer composition in an amount from about 0.1% to about 5% by weight, such as from about 0.3% to about 2% by weight.

In addition to an acid scavenger as described above, the polymer composition can also contain an odor masking agent. The odor masking agent, for instance, can absorb odors and/or produce its own odor. Masking agents that may be incorporated into the composition include zeolites, particularly synthetic zeolites, fragrances, and the like.

Other additives and ingredients that may be included in the polymer composition include antioxidants, pigments, lubricants, softening agents, antibacterial agents, antifungal agents, preservatives, flame retardants, and combinations thereof. Each of the above additives can generally be present in the polymer composition in an amount of about 5% or less, such as in an amount of about 2% or less, and generally in an amount of about 0.1% or greater, such as in an amount of about 0.3% or greater.

Flame retardants suitable for use in conjunction with a cellulose ester plastic described herein may, in some embodiments, include, but are not limited to, silica, metal oxides, phosphates, catechol phosphates, resorcinol phosphates, borates, inorganic hydrates, aromatic polyhalides, and the like, and any combination thereof.

Antifungal and/or antibacterial agents suitable for use in conjunction with a cellulose ester plastic described herein may, in some embodiments, include, but are not limited to, polyene antifungals (e.g., natamycin, rimocidin, filipin, nystatin, amphotericin B, candicin, and hamycin), imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, caprylic acid, and any combination thereof.

Preservatives suitable for use in conjunction with a cellulose ester plastic described herein may, in some embodiments, include, but are not limited to, benzoates, parabens (e.g., the propyl-4-hydroxybenzoate series), and the like, and any combination thereof.

Pigments and dyes suitable for use in conjunction with a cellulose ester plastic described herein may, in some embodiments, include, but are not limited to, plant dyes, vegetable dyes, titanium dioxide, silicon dioxide, tartrazine, E102, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL® Brilliant Yellow K-6G liquid, CARTASOL® Yellow K-4GL liquid, CARTASOL® Yellow K-GL liquid, CARTASOL® Orange K-3GL liquid, CARTASOL® Scarlet K-2GL liquid, CARTASOL® Red K-3BN liquid, CARTASOL® Blue K-5R liquid, CARTASOL® Blue K-RL liquid, CARTASOL® Turquoise K-RL liquid/granules, CARTASOL® Brown K-BL liquid), FASTUSOL® dyes (an auxochrome, available from BASF) (e.g., Yellow 3GL, Fastusol C Blue 74L), and the like, any derivative thereof, and any combination thereof.

In some embodiments, pigments and dyes suitable for use in conjunction with a cellulose ester plastic described herein may be food-grade pigments and dyes. Examples of food-grade pigments and dyes may, in some embodiments, include, but are not limited to, plant dyes, vegetable dyes, titanium dioxide, and the like, and any combination thereof.

Antioxidants may, in some embodiments, mitigate oxidation and/or chemical degradation of a cellulose ester plastic described herein during storage, transportation, and/or implementation. Antioxidants suitable for use in conjunction with a cellulose ester plastic described herein may, in some embodiments, include, but are not limited to, anthocyanin, ascorbic acid, glutathione, lipoic acid, uric acid, resveratrol, flavonoids, carotenes (e.g., beta-carotene), carotenoids, tocopherols (e.g., alpha-tocopherol, beta-tocopherol, gamma-tocopherol, and delta-tocopherol), tocotrienols, tocopherol esters (e.g., tocopherol acetate), ubiquinol, gallic acids, melatonin, secondary aromatic amines, benzofuranones, hindered phenols, polyphenols, hindered amines, organophosphorus compounds, thioesters, benzoates, lactones, hydroxylamines, butylated hydroxytoluene ("BHT"), butylated hydroxyanisole ("BHA"), hydroquinone, and the like, and any combination thereof.

In some embodiments, antioxidants suitable for use in conjunction with a cellulose ester plastic described herein may be food-grade antioxidants. Examples of food-grade antioxidants may, in some embodiments, include, but are not limited to, ascorbic acid, vitamin A, tocopherols, tocopherol esters, beta-carotene, flavonoids, BHT, BHA, hydroquinone, and the like, and any combination thereof.

In still another aspect, the polymer composition can contain one or more foaming agents or blowing agents. For instance, the polymer composition can be in the form of a foam or can be formed into a foam during the production of a polymer article.

The polymer composition of the present disclosure can be formed into any suitable polymer article using any technique known in the art. For instance, polymer articles can be formed from the polymer composition through extrusion, injection molding, blow molding, and the like.

Various processes for producing composite polymers in accordance with the present disclosure are described in, for example, U.S. Patent Publication Nos. 2016/0201266, 2013/0276670, 2013/0210965, 2013/0210964, 2013/0207302, 2013/0207297, 2013/0207295, 2013/0206037, 2013/0206036, and 2013/0206035, which are all incorporated herein by reference.

In one aspect, the polymer composition containing the cellulose acetate can be formulated such that the polymer composition has properties very comparable to petroleum-based polymers, such as polypropylene. By matching the physical properties of a petroleum-based polymer, the polymer composition of the present disclosure is well suited to replacing those polymers in many different end use applications.

Polymer articles that may be made in accordance with the present disclosure include drinking straws, beverage holders, automotive parts, knobs, door handles, consumer appliance parts, and the like.

For instance, referring to FIG. 1, a drinking straw 10 is shown that can be made in accordance with the present disclosure. In the past, drinking straws were conventionally made from petroleum-based polymers, such as polypropylene. The cellulose acetate polymer composition of the present disclosure, however, can be formulated so as to match the physical properties of polypropylene. Thus, drinking straws 10 can be produced in accordance with the present disclosure and be completely biodegradable.

Figure 2:
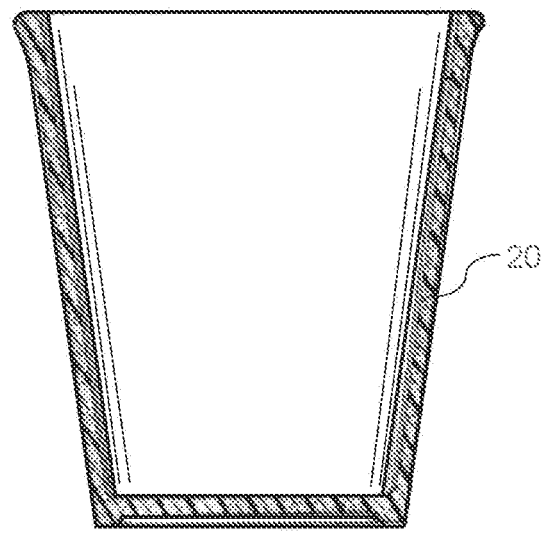
FIG. 2 is a cross-sectional view of a beverage holder that may be made in accordance with the present disclosure.
Figure 7:
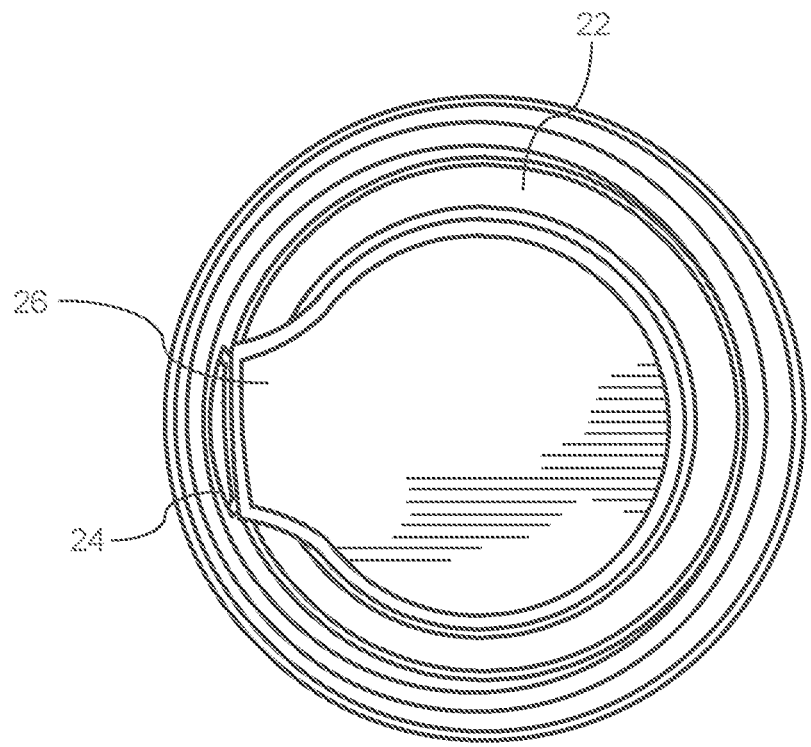
FIG. 7 is a perspective view of a lid made in accordance with the present disclosure.

Referring to FIG. 2, a cup or beverage holder 20 is shown that can also be made in accordance with the present disclosure. The cup 20 can be made, for instance, using injection molding or through any suitable thermoforming process. As shown in FIG. 7, a lid 22 for the cup 20 can also be made from the polymer composition of the present disclosure. The lid can include a pour spout 24 for dispensing a beverage from the cup 20. In addition to lids for beverage holders, the polymer composition of the present disclosure can be used to make lids for all different types of containers, including food containers, package containers, storage containers and the like.

Figure 3:
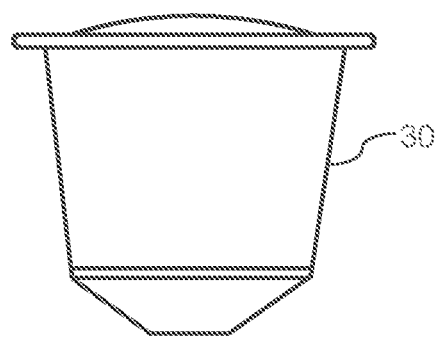
FIG. 3 is a side view of one embodiment of a beverage pod that can be made in accordance with the present disclosure.
Figure 4:
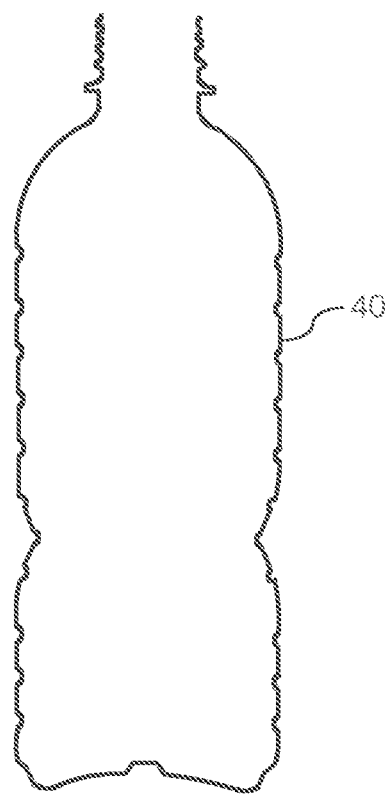
FIG. 4 is a cross-sectional view of a drinking bottle that may be made in accordance with the present disclosure.

In still another embodiment, the polymer composition can be used to produce a hot beverage pod 30 as shown in FIG. 3. In addition to the beverage pod 30, the polymer composition can also be used to produce a plastic bottle 40 as shown in FIG. 4, which can serve as a water bottle or other sport drink container.

Figure 5:
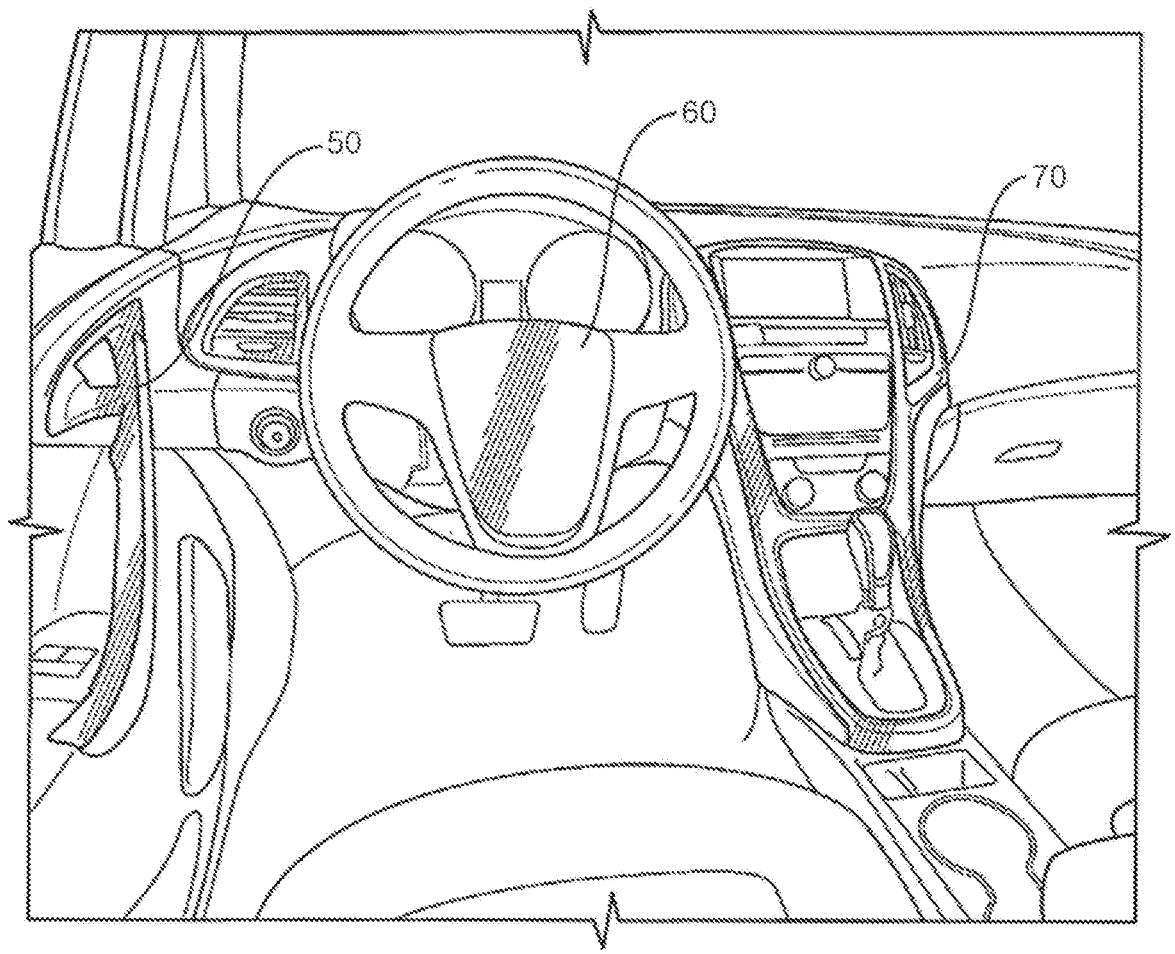
FIG. 5 is a perspective view of an automotive interior illustrating various articles that may be made in accordance with the present disclosure.

Referring to FIG. 5, an automotive interior is illustrated. The automotive interior includes various automotive parts that may be made in accordance with the present disclosure. The polymer composition, for instance, can be used to produce automotive part 50, which comprises at least a portion of an interior door handle. The polymer composition may also be used to produce a part on the steering column, such as automotive part 60. In general, the polymer composition can be used to mold any suitable decorative trim piece or bezel, such as trim piece 70. In addition, the polymer composition can be used to produce knobs or handles that may be used on the interior of the vehicle.

Figure 6:
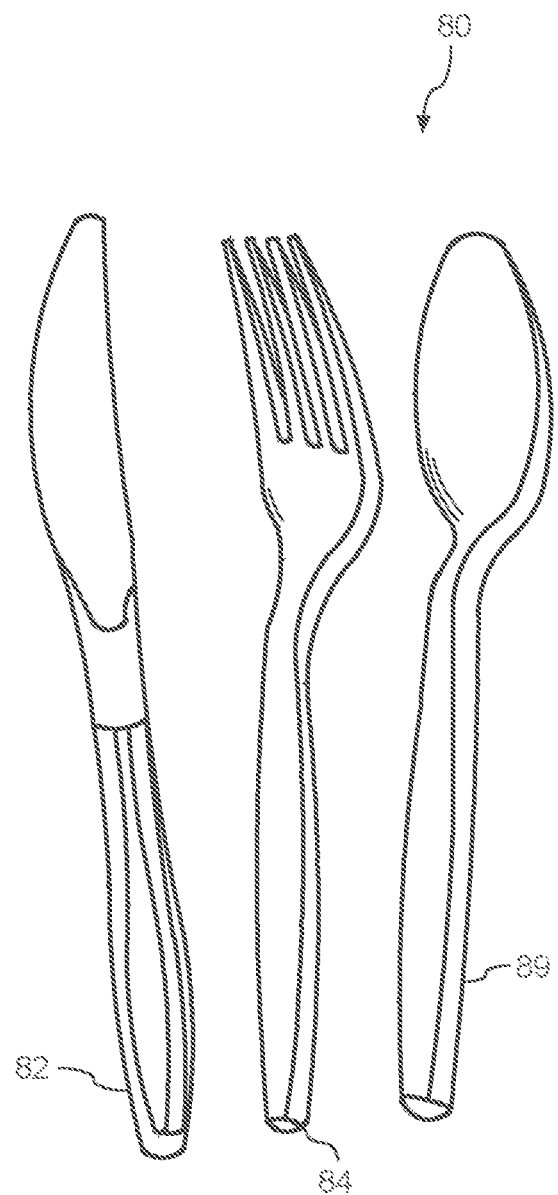
FIG. 6 is a perspective view of cutlery made in accordance with the present disclosure.

The polymer composition is also well suited to producing cutlery, such as forks, spoons, and knives. For example, referring to FIG. 6, disposable cutlery 80 is shown. The cutlery 80 includes a knife 82, a fork 84, and a spoon 86.

Figure 8:
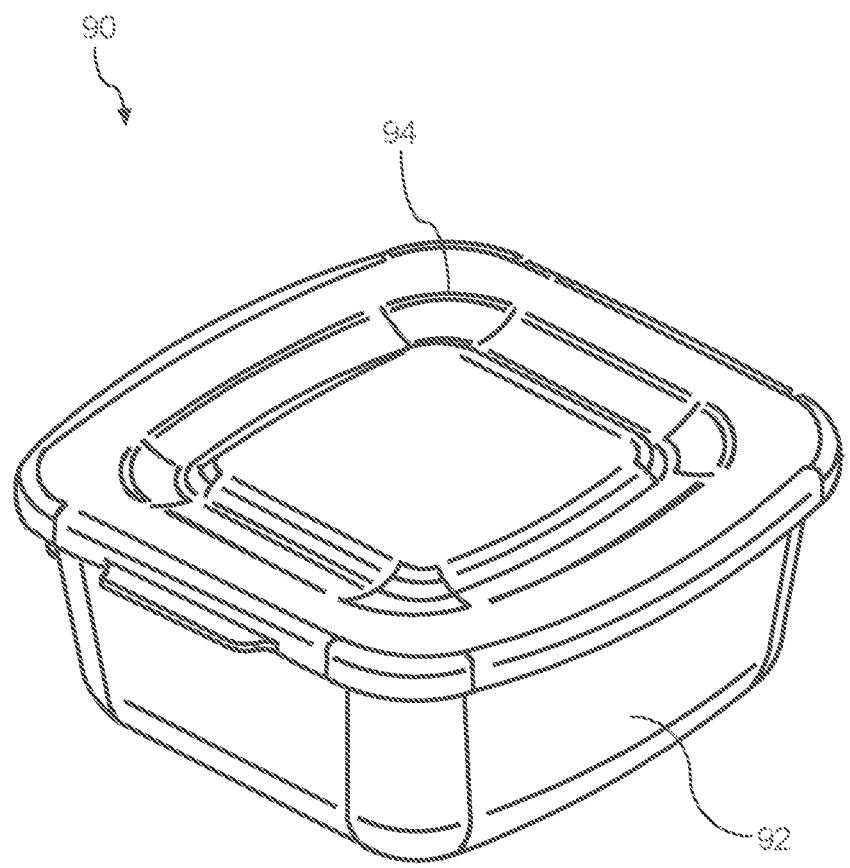
FIG. 8 is a perspective view of a container made in accordance with the present disclosure.

In still another embodiment, the polymer composition can be used to produce a storage container 90 as shown in FIG. 8. The storage container 90 can include a lid 94 that cooperates and engages the rim of a bottom 92. The bottom 92 can define an interior volume for holding items. The container 90 can be used to hold food items or dry goods.

In still other embodiments, the polymer composition can be formulated to produce paper plate liners, eyeglass frames, screwdriver handles, or any other suitable part.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polymer composition comprising:
   a cellulose ester polymer;
   a plasticizer comprising an acetylglycerol or polyethylene glycol;
   an acid scavenger; and
   a biodegradable filler, the biodegradable filler comprising a monosaccharide, a monosaccharide ester, a polysaccharide, a polysaccharide ester, or mixtures thereof.

2. A polymer composition as defined in claim 1, wherein the biodegradable filler comprises fibers.

3. A polymer composition as defined in claim 1, wherein the biodegradable filler comprises a powder or particles.

4. A polymer composition as defined in claim 1, wherein the biodegradable filler comprises dextran, a starch, a modified starch, a hydrolyzed starch, a modified hydrolyzed starch, alpha-1,3-glucan or mixtures thereof.

5. A polymer composition as defined in claim 1, wherein the biodegradable filler comprises bast fibers.

6. A polymer composition as defined in claim 5, wherein the bast fibers comprise hemp.

7. A polymer composition as defined in claim 1, wherein the biodegradable filler comprises cellulose fibers, sisal fibers, viscose fibers, or mixtures thereof.

8. A polymer composition as defined in claim 7, wherein the cellulose fiber comprises hardwood fibers, softwood fibers, or mixtures thereof.

9. A polymer composition as defined in claim 1, wherein the biodegradable filler comprises alpha cellulose or an engineered polysaccharide.

10. A polymer composition as defined in claim 1, wherein one or more biodegradable fillers are present in the polymer composition in an amount from about 0.1% to about 75% by weight.

11. A polymer composition as defined in claim 1, wherein one or more biodegradable fillers are present in the polymer composition in an amount from about 3% to about 25% by weight.

12. A polymer composition as defined in claim 1, wherein the cellulose ester polymer comprises cellulose acetate having a degree of substitution of from about 1.3 to about 2.8.

13. A polymer composition as defined in claim 1, wherein the acid scavenger comprises an alkali metal salt, an alkaline earth metal salt, a carbonate, an oxide, a hydroxide, an amine, or a mixture thereof.

14. A polymer composition as defined in claim 1, wherein the plasticizer comprises monoacetin, diacetin, triacetin or mixtures thereof.

15. A polymer composition as defined in claim 1, wherein the cellulose ester polymer is present in the composition in an amount of from about 15% to about 85% by weight and the plasticizer is present in the composition in an amount of from about 8% to about 40% by weight.

16. A polymer composition as defined in claim 1, wherein the cellulose acetate consists essentially of cellulose diacetate.

17. An article made from the polymer composition as defined in claim 1.

18. An article as defined in claim 17, wherein the article is a beverage holder, a drinking straw, a hot beverage pod, a fork, a knife, a spoon, packaging, a container, a lid, or an interior automotive part.

19. A polymer composition as defined in claim 1, wherein the polymer composition is in the form of extruded pellets, a film, or a foam.

20. An article as defined in claim 17, wherein the article has been formed through injection molding or extrusion.

\* \* \* \* \*